March 27, 1928.  1,663,729
V. P. RAGENOVIC
TOY
Filed April 29, 1926  2 Sheets-Sheet 1
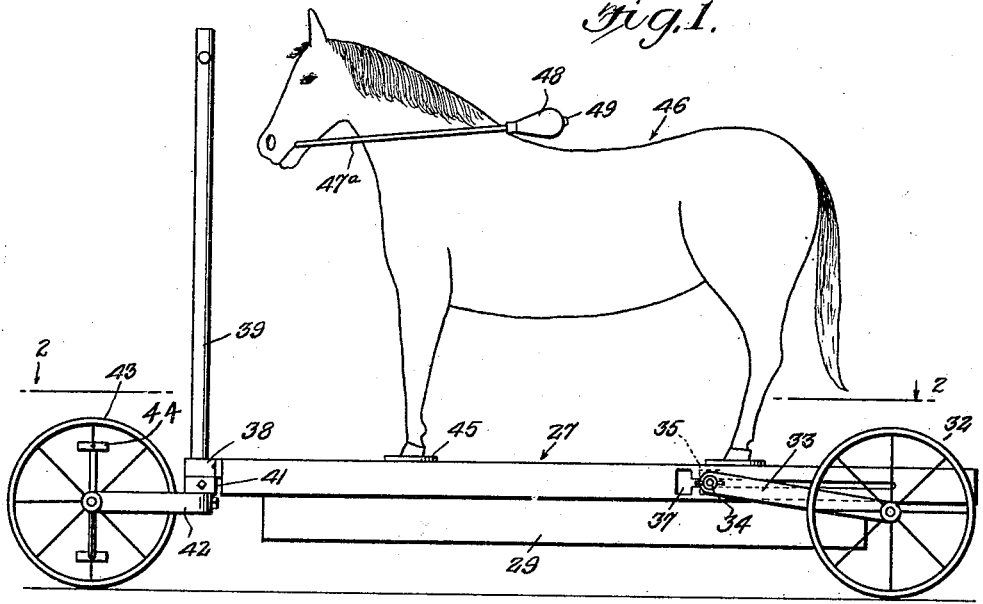

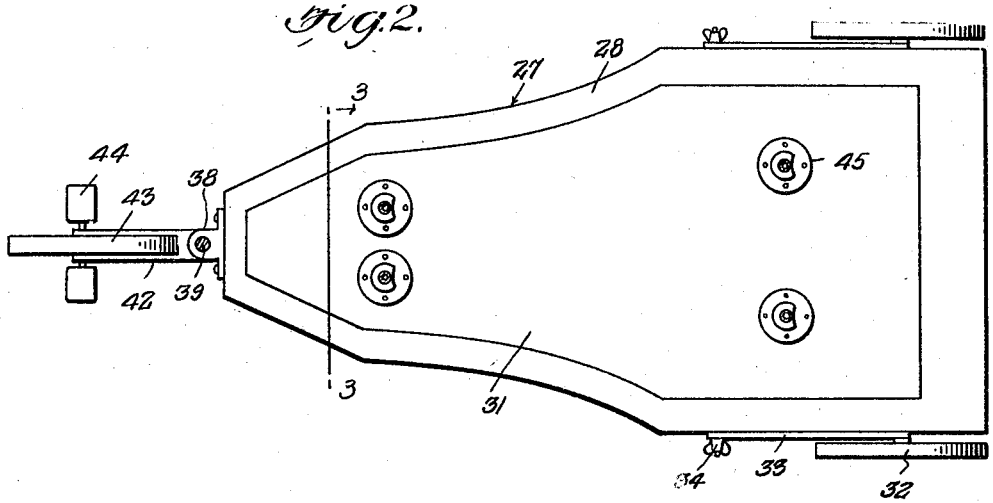
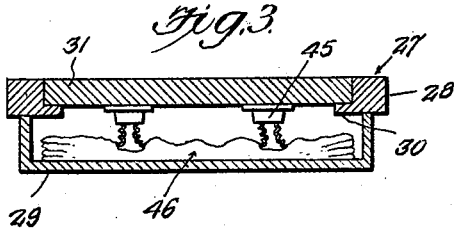

Patented Mar. 27, 1928.

1,663,729

UNITED STATES PATENT OFFICE.

VIDO P. RAGENOVIC, OF PORTLAND, OREGON.

TOY.

Application filed April 29, 1926. Serial No. 105,478.

This invention relates to an improved toy and it has reference in one instance to a toy which is adapted to be pulled along a supporting surface by a cord or the like and in another instance to be occupied and driven by a child.

The invention includes a convertible structure which embodies a platform, appropriate supporting wheels, a rubber horse, and means whereby the horse may be entirely concealed and disposed out of view.

Other structural features and advantages of the invention will become apparent from the following description and drawings.

In the accompanying drawings, forming a part of this application, and in which like numerals are employed to designate like parts throughout the same:—

Fig. 1 is a side elevation of the toy as constructed in accordance with the invention, Fig. 2 is a section taken approximately upon the plane of the line 2—2 of Fig. 1, Fig. 3 is a cross section taken on the line 3—3 of Fig. 2, Fig. 4 is a side view like Fig. 1, showing the vehicle converted for use by a child, the imitation horse being concealed at this time, Fig. 5 is a section on the line 5—5 of Fig. 4, the view being enlarged.

Observing Fig. 1, it will be seen that the reference character 27 designates a platform. This platform is of the configuration shown in top plan in Fig. 2. Then, as shown in Fig. 3, it will be seen that it comprises a marginal frame 28 of the configuration shown, carrying a box 29 on its under side. The frame is constructed to provide supporting ledges 30 on which a removable cover plate 31 rests.

At the rear end of the platform are supporting wheels 32 equipped with supporting arms 33. These supporting arms as shown in Fig. 5, are connected by bolts 34 to blocks 35 slidable in grooves 36 formed in the outer marginal part of the frame 28. This permits the blocks to be slid to the forward ends of the slot to allow the platform 27 to be lowered or permits the blocks to be slid to the opposite ends of the slot to raise the platform, at which time the arms 33 are in vertical position. The slots are provided with appropriate entrances 37.

At the forward end of the platform is a guide 38 which is slidable on a standard 39 at the upper end of which is an appropriate handle 40. This guide 38 rests upon an adjustable collar 41 which is also slidable on the standard, and is held in place by a set screw. The lower end of this standard is connected with an arm 42 with which the front steering wheel 43 is in turn connected. If desired, the shaft of this wheel may be provided with operating pedals 44.

From the foregoing, it is obvious that by disposing the cover plate 31 in such a manner as to position the coupling hoofs 45 on top, the imitation animal 46 may be inflated. This is done by an air conducting tube 47$^a$ and common pressure bulb 48. Here again, the bulb is provided with a release valve 49 of appropriate construction. At this time, the platform is arranged in lowered position shown in Fig. 1. If it is not desired to have the horse in position, the cover plate can be turned upside down as shown in Fig. 3 at which time the horse is deflated. Then the platform 27 can be raised to the horizontal elevated position shown in Fig. 4. At this time, the front steering wheel is turned so that it is disposed beneath the platform as shown. It will thus be seen that a convertible structure is provided wherein the parts can be arranged either as shown in Fig. 1, or converted to form the occupant's steered vehicle represented in Fig. 4.

It is of course understood that the imitation inflated animal 46 is not adapted to be straddled and ridden by a child. It is merely of sufficient rigidity to assume an erect position while it is drawn along the surface. For instance, as is shown in Figure 1, where the platform 27 is down close to the ground, it is obvious that a suitable cord, (not shown) can be attached to the standard or the arm 42, thus permitting the device to be drawn along the surface, the same as the device shown in Figure 4. Also when the device is converted to the elevated state shown, in Figure 4, then the platform is straddled, the arm 42 is turned around beneath the platform, and the toy is held in an obvious manner. At this time the cover plate 31 is turned over to dispose the deflated horse 46 within the box 29 as shown in Figure 3.

Having thus described my invention, what I claim as new is:—

1. In a structure of the class described, a platform, rear wheels at the rear end of the platform, supporting arms associated with said wheels, said supporting arms having slidable connection with the platform, retaining means carried by the slidable ends of said arms, and cooperable with said platform, whereby to permit the arms to be lowered or raised to dispose this end of the platform in an elevated or a lowered position, a front steering wheel, a standard connected thereto, said platform being adjustably connected with the standard at its forward end.

2. In a structure of the class described, a platform provided adjacent its rear end with slots, a pair of rear supporting wheels, arms connected with said wheels and having slidable and adjustable connection with said slots, a front steering wheel, an arm connected with said wheel, a standard rising from said arm, a guide on the forward end of said platform, said guide being slidable upon said standard.

In testimony whereof I affix my signature.

VIDO P. RAGENOVIC.